United States Patent Office

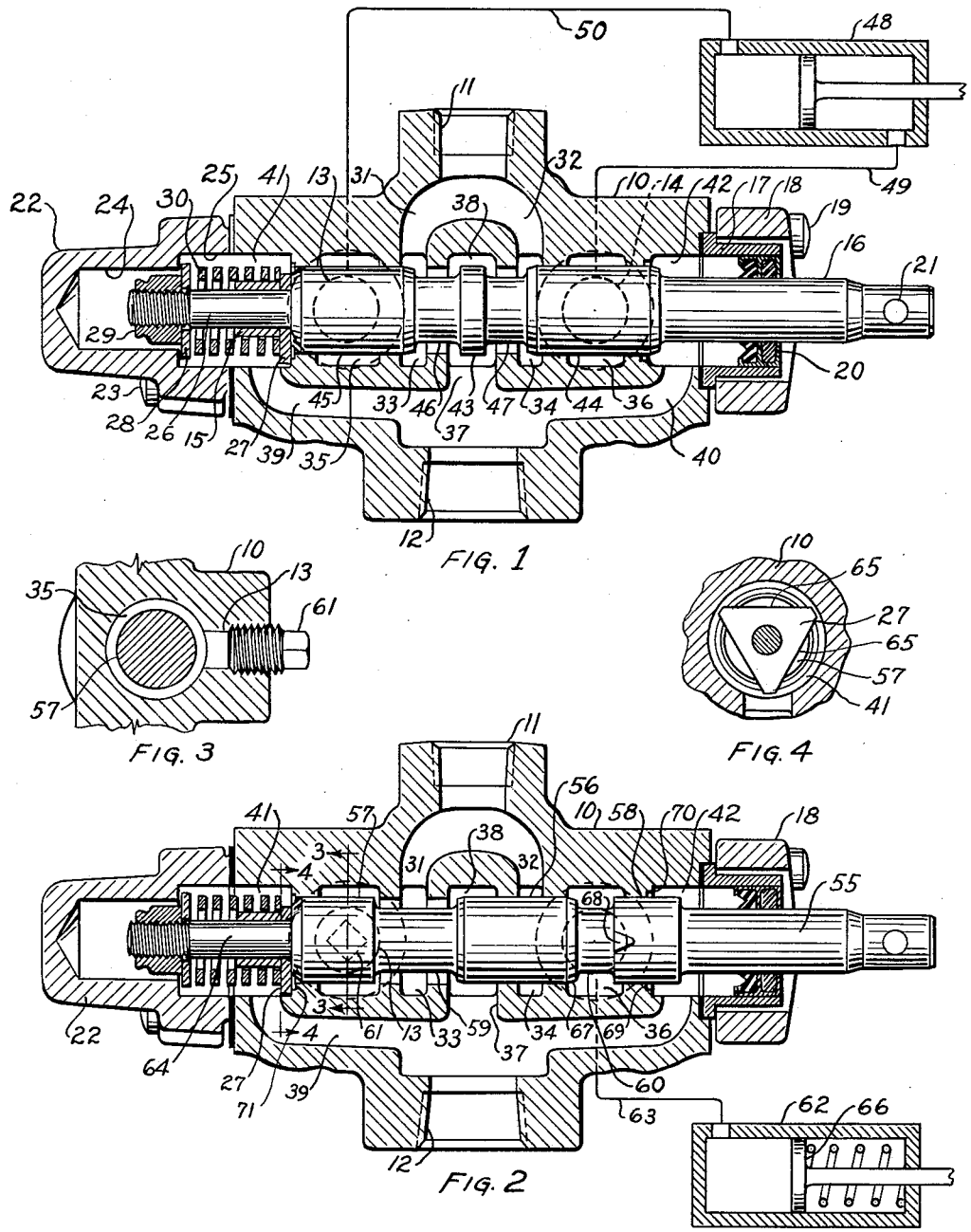

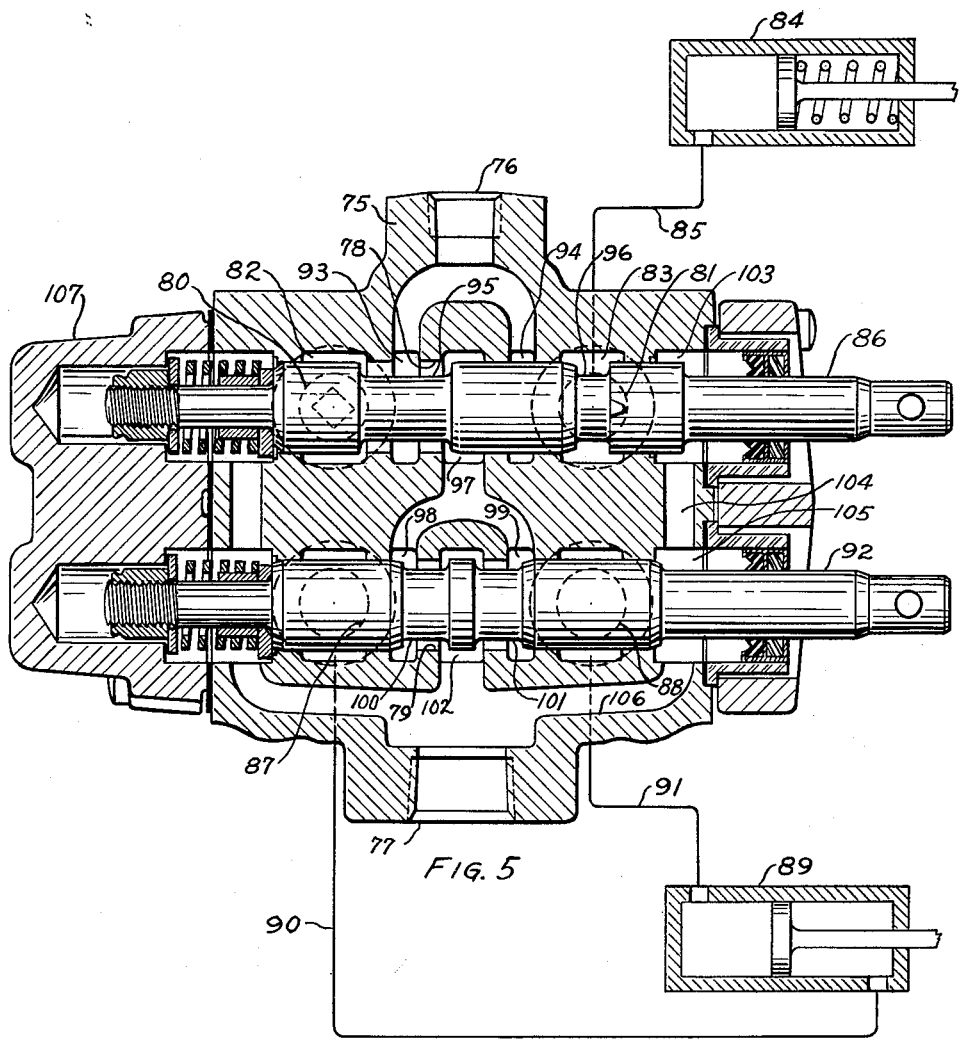

2,718,240
Patented Sept. 20, 1955

2,718,240

HYDRAULIC CONTROL VALVE

Wilton Margrave, South Euclid, Ohio, assignor to The Parker Appliance Company, Cleveland, Ohio, a corporation of Ohio Application November 17, 1950, Serial No. 196,271

2 Claims. (Cl. 137—622)

This invention relates to hydraulic control valves and is particularly concerned with 3-way and 4-way valves for controlling the operation of single and double acting fluid motors.

With single acting fluid motors, fluid under pressure is admitted to only one side of the motor piston and a single pipe line is utilized for supplying and exhausting the motive fluid to and from the motor. Valves for controlling the flow of fluid through this single line are referred to as 3-way valves. Double acting cylinders require motive fluid to be admitted and exhausted from both sides of the motor piston alternately and require two pipe lines for this purpose. Valves for controlling the flow of fluid through the two pipes lines are referred to as 4-way valves.

It is an object of the present invention to provide a valve arrangement in which a valve body having a bore and a plurality of ports connected with the bore can be utilized for either 3 or 4-way valve operation by plugging or unplugging one of the ports and utilizing either a 3-way or a 4-way valve plunger within the bore. In this manner only a single type of valve body need be provided in order to produce either 3-way or 4-way valves.

It is another object to provide a valve arrangement in which a single valve body may be utilized for either a single or a double acting fluid motor by inserting either a 3-way or a 4-way valve plunger into either end of the body.

It is another object to provide a valve arrangement in which a single valve body is adaptable to 3-way operation by plugging one of two motor ports formed in the body and utilizing a 3-way plunger, or is adaptable to 4-way operation by utilizing both motor ports and a 4-way plunger, and in which the 3-way plunger is so formed that the plugged port will be open to an exhaust passage at all times except when fluid under pressure is being directed to the unplugged motor port.

It is another object to provide a valve arrangement of the balanced plunger, open-center type, in which a 4-way type valve body may be adapted for 3-way operation by plugging one motor port and inserting a 3-way valve plunger, and in which the plugged port is not subject to high fluid pressure when the valve plunger is in position for exhausting fluid from the single acting motor.

It is another object to provide a valve arrangement in which a valve body has a bore and a plurality of ports connected with the bore and which body can be utilized for either 3 or 4-way valve operation by plugging or unplugging one of the ports and utilizing either a 3-way or a 4-way valve plunger within the bore, and in which such plungers are solid and formed with lands and grooves for controlling inter-port flow through the bore. By thus providing solid valve plungers having lands and grooves for controlling the flow, expensive drilling operations in the plungers are dispensed with, and a simpler, more efficient, and cheaper valve structure is obtained.

It is another object to provide a 3-way valve of the open center type in which fluid delivered to the inlet port is directed to the outlet port while the valve plunger is in the neutral or center position.

It is another object to provide a hydraulic control valve of the reciprocating plunger type in which a transverse surface which intersects the valve bore in which the plunger is contained is specially machined to provide a smooth and uniform surface past which fluid may be accurately metered by restricted flow passages formed on the plunger.

The feature of having a single valve body adaptable to either 3-way or 4-way valve operation is particularly desirable in connection with multiple type valves in which a single valve body has a plurality of bores for receiving a multiple of valve plungers and wherein the valve body has a common inlet port and a common outlet port but separate motor ports associated with each bore. In such multiple type valves, when the arrangement of flow passages in connection with each bore is the same, any bore can be adapted to control either a single or a double acting fluid motor by merely inserting either a 3-way or a 4-way valve plunger and plugging or unplugging an associated motor port. Obviously, this reduces to one the number of valve bodies required for any given multiple of valve bores for controlling any given number of fluid motors in any combination of single or double acting types. It is, therefore, another object of the invention to provide a valve arrangement in which a valve body has a common inlet and a common outlet and has a plurality of valve bores between the inlet and the outlet for interchangeably receiving either 3-way or 4-way valve plungers for controlling either single or double acting fluid motors connected with the ports associated with each valve bore.

It is another object to provide a valve arrangement in which a valve body has a common inlet and a common outlet and has a plurality of valve bores between the inlet and the outlet for interchangeably receiving either 3-way or 4-way valve plungers for controlling either single or double acting fluid motors connected with the port or ports associated with each valve bore, and wherein the control surfaces of the 3-way plungers are so arranged with respect to the passages through the valve body that operation of either a 3-way or 4-way valve plunger in any other bore may be effected while the first-mentioned 3-way plunger is in either of two positions within its bore.

Other objects will be apparent from a detailed description and from the drawings, in which:

Figure 1 is a vertical section through a valve in which the valve body has a bore and two motor ports and in which a 4-way plunger is arranged in the bore for operation of a double acting fluid motor.

Figure 2 is a vertical section through a valve using the same body as the 4-way valve of Figure 1 but with one motor port plugged and with a 3-way plunger in the bore for controlling a single acting fluid motor.

Figure 3 is a fragmentary section taken along the lines 3—3 of Figure 3 and showing the plugged motor port.

Figure 4 is a fragmentary section taken along the lines 4—4 of Figure 2 and showing a triangular shaped stop member at one end of the plunger.

Figure 5 is a vertical section through a multiple valve in which a unitary valve housing has two bores, in one of which a 3-way plunger is inserted and the other in which a 4-way plunger is mounted.

In accordance with the present invention, a valve body normally used in connection with 4-way control of a double acting fluid motor is utilized for 3-way operation of a single acting fluid motor. This is accomplished by plugging one of the motor ports in the valve body and substituting a different valve plunger which has lands and grooves so arranged in relation with passages in the body that 3-way valve action will be obtained when the valve plunger is shifted to various positions in the bore. For purposes of illustration, the 4-way valve arrangement has been included in the drawings as Figure 1. This valve comprises a body 10 and having an inlet port 11 and an outlet port 12 and a pair of motor ports 13 and 14. The body has a central bore therethrough in which is mounted a 4-way valve plunger 16. At one end of the bore there is a sleeve 17 held in place by a retainer member 18 which is bolted to the body by bolts 19. One end of the plunger projects from the bore and extends through the sleeve 17 and is sealed by a suitable packing 20 attached to the sleeve. The extending portion of the valve plunger has a hole 21 therethrough by means of which any suitable handle or operating mechanism, not shown, may be attached to the plunger for reciprocating the same within the valve bore.

The other end of the valve bore is closed by a cap 22 attached to the body by bolts 23. The cap has a bore 24 and a counterbore 25 for receiving an extension 26 on the valve plunger. Mounted on one end of this extension is a triangular stop member 27 and a cylindrical bushing 15. At the other end of the extension 26 is a collar 28 which is held thereon by a nut 29 threaded upon the extension. A spring 30 is interposed between the collar 28 and the stop member 27 and serves to urge the plunger toward a neutral position within the bore when the plunger has been moved in either direction from the neutral position. The inlet port 11 communicates with a pair of branch inlet passages 31 and 32 which intersect annular chambers 33 and 34 which surround and communicate with the valve bore at spaced points. The chambers 33 and 34 and the branch inlet passages 31 and 32 thus constitute a passage means for connecting the inlet to the bore at spaced points.

The motor port 13 communicates with a chamber 35 which surrounds the valve bore at a point outwardly of the chamber 33 and the motor port 14 communicates with a chamber 36 which surrounds the bore at a point outwardly of the inlet chamber 34. The outlet port 12 is open by means of a passage 37 to an exhaust chamber 38 which surrounds the valve bore intermediate the inlet chambers 33 and 34. The outlet 12 is also open by means of passages 39 and 40 to exhaust chambers 41 and 42 formed at each end of the valve bore. The valve plunger has a central land 43 and a pair of outwardly spaced lands 44 and 45 and has a pair of recesses 46 and 47 between the lands.

When the valve plunger is in the neutral position as shown, fluid from a suitable source of supply enters the inlet port 11 and passes through the branch inlet passages 31 and 32 to the chambers 33 and 34 and then through the recesses 46 and 47 to the central exhaust chamber 38 and from there through the passage 37 to the outlet port 12, from which it is returned to a reservoir, not shown. Meanwhile the lands 44 and 45 block the valve bore on both sides of each of the chambers 35 and 36 leading to the motor ports and thus the latter are isolated so that no fluid can flow to or from a double acting motor 48 whose opposite ends may be connected to the motor ports by means of suitable pipe lines 49 and 50.

Movement of the valve plunger in the right hand direction from the position shown in Figure 1 will cause the branch inlet passage 32 to be connected to the motor chamber 36 and will cause the motor chamber 35 to be connected to the exhaust chamber 41, whereas movement of the plunger in the left-hand direction will cause the inlet passage 31 to be open to the motor chamber 35 and the motor chamber 36 to be open to the exhaust chamber 42. In this manner fluid may be admitted to or exhausted from the opposite ends of the double acting fluid motor 48 for 4-way control of the same.

In order to utilize the valve body illustrated in Figure 1 for 3-way valve action, the motor port 13 is plugged and a different valve plunger is substituted for the 4-way plunger 16. This new combination is illustrated in Figure 2. In this figure, since the valve body is the same as that of Figure 1, the various portions thereof are designated by the same numerals.

As shown in Figure 2, the 3-way plunger 55 has an elongated central land 56, a pair of outer lands 57 and 58, and grooves 59 and 60 between the lands. The motor port 13 is plugged by a suitable plug 61, as shown in Figure 3, and the motor port 14 is connected to a single acting motor 62 by means of a pipe line 63.

In the neutral position of the plunger, as shown in Figure 2, the lands 56 and 58 block the valve bore on either side of the motor chamber 36 to isolate the same and thus prevent fluid from being admitted to or exhausted from the single acting motor 62. Meanwhile the groove 59 permits communication of the inlet chamber 33 with both the motor chamber 35 and the central exhaust chamber 38. Since fluid from the inlet port 11 passes freely to the outlet port it does not build up a pressure within the valve in this position. When incoming fluid is freely exhausted in this manner in the neutral position, the valve is referred to as an open center type.

When the 3-way valve plunger 55 is moved to the left, the groove 60 will place the inlet chamber 34 in communication with the motor chamber 36 and fluid will be delivered to the single acting motor 62. Meanwhile, the land 56 will cut off the communication between the inlet chamber 33 and the exhaust chamber 38 so that fluid entering through the inlet port will be caused to build up in pressure as it is being delivered to the single acting motor.

Movement of the plunger in the right-hand direction from the neutral position will cause the motor chamber 36 to be connected to the exhaust chamber 42 through the groove 60 so that fluid will drain from the motor 62 to the outlet port 12 of the valve. At the same time, the reduced extension 64 of the plunger will overlap the plugged motor port 35 and connect it with the exhaust chamber 41 past the flat portions 65 of the stop collar 27. In this way, fluid which had been under pressure within the plugged motor port while the valve plunger was in the left-hand position is fully relieved. Otherwise, if it was not relieved but remained trapped within the plugged motor port, it would exert a pressure between the land 57 and the plunger bore and maintain a fluid-friction effect therebetween which would make movement of the valve plunger correspondingly more difficult.

In order to accurately control the movement of the piston 66 in the single acting motor 62 the 3-way plunger 55 is provided with metering surfaces. Thus in order to accurately control the flow of fluid under pressure from the inlet chamber 34 to the motor port 36 when the valve plunger is moved in the leftward direction, the land 56 is provided with a taper 67 on its right-hand end. Similarly, the land 58 is provided with several tapered notches 68 for accurately metering the fluid from the motor chamber 36 to the exhaust chamber 42 when the spool is moved in the right hand direction. To obtain maximum sensitivity in metering past the notches 68, the bottom wall of the exhaust chamber 42 is provided with a shallow counterbore 69. Ordinarily, the valve body is made of cast iron and the various passages and chambers are formed by coring during the casting operation and the only internal surface which is machine finished is the bore through the valve. Since cored surfaces are relatively rough and not always straight, it is not always possible to form the bottom wall 70 and the exhaust chamber 42 as smooth and uniform as desired. To avoid irregular metering by the slots 68 as they project past the surface 70, the latter is counterbored as at 69 by a machine operation. This assures a smooth and truly transverse surface past which the fluid may be accurately metered through the slots 68. A similar counterbore 71 is formed on the opposite side of the valve body so that the same accurate metering can be obtained when the valve plunger is reversed in its position within the valve body.

In addition to providing a three-way valve plunger for a body adaptable to 4-way operation, it has also been an object to so form the 3-way plunger that when it is used in a multiple type valve housing having a common inlet and a common outlet, it will cooperate with the body passages to permit either 3-way or 4-way operation of other valve plungers mounted in the same body. This is illustrated, for example, in Figure 5. In this figure the valve housing 75 is provided with a common inlet port 76 and a common outlet port 77 and has an upstream bore 78 and a downstream bore 79 formed therein. A pair of motor ports 80 and 81 are associated with the bore 78 and communicate therewith by means of motor chambers 82 and 83. The motor port 80 is plugged in a manner similar to that shown in Fig. 3 and the motor port 81 is connected to a single acting cylinder 84 by means of a pipe line 85. A 3-way valve plunger 86 is mounted within this bore and is identical with the plunger 55 of Fig. 2.

Motor ports 87 and 88 are associated with the other valve bore 79 and are connected to opposite ends of a double acting cylinder 89 by means of pipe lines 90 and 91. A 4-way valve plunger 92 is mounted within this bore and is identical with the plunger 16 of Fig. 1.

Both of the plungers 86 and 92 are illustrated in their neutral positions. It will be seen that in these positions the fluid entering the inlet 76 flows to the chamber 93, past the plunger groove 95 to the exhaust chamber 97, then through both of the inlet chambers 98 and 99 and past the plunger grooves 100 and 101 to the exhaust chamber 102 and then out through the outlet 77. While the 3-way valve plunger 86 is in this neutral position, it will be apparent that the 4-way plunger 92 may be operated in either direction to accomplish 4-way operation of the double acting cylinder 89, in the manner already described in connection with Fig. 1. Such 4-way operation may be accomplished as long as incoming fluid is being discharged from the exhaust port 97 of the 3-way valve into the inlet chambers 98 and 99 of the 4-way valve.

When the 3-way valve plunger 86 is shifted to the right for draining the single acting motor 84, the drained fluid passes from the motor chamber 83 to the exhaust chamber 103 and through the passage 104 to the 4-way valve exhaust chamber 105, and then through the passage 106 to the outlet 77. This fluid is under low pressure and has no appreciable effect upon the 4-way valve. Meanwhile, the groove 95 of the 3-way valve plunger maintains communication between the inlet chamber 93 and the exhaust chamber 97 so that incoming fluid will continue to be delivered to the inlet chambers 98 and 99 of the 4-way valve. Thus the 4-way valve may function as before while the 3-way plunger is in the right-ward position.

Not only can the 4-way plunger 92 be operated when it is in the bore 79 downstream of the 3-way valve plunger while the latter is in either of two positions, but it may also be operated for two positions of the 3-way plunger when it is in the upstream bore 78 and the 3-way plunger is in the downstream bore 79.

Also since the chambers which intersect each valve bore are symmetrically arranged, the same operational results are obtained if the plungers are reversed in their respective bores so that the operating extensions project from the opposite side of the valve body. This is also true if only one plunger is reversed so that one extension projects from one side and the other from the other side of the valve body. In such case it is, of course, necessary to provide individual caps, similar to that of cap 22 in Fig. 1, for each bore instead of the common cap 107 of Fig. 5.

If desired, two or more 3-way valve plungers may be mounted in valve bores of a multiple type body similar to Fig. 5 and 3-way operation of any plunger may be effected while any other 3-way valve is in either of two positions as described.

It is apparent that applicant has provided a valve arrangement in which a single valve body may be utilized for either 3-way or 4-way valve operation and has accomplished this by the use of solid 3-way and 4-way valve plungers which do not have expensive drilled passages, and also accomplishes it in a manner whereby a valve port which is plugged during 3-way operation is freely relieved or exhausted so as to not contain any trapped fluid under pressure for at least 2 positions of the valve plunger. Also, the arrangement of the lands and grooves on the 3-way valve plunger is such that one 3-way valve unit may be combined with other valve units in a single housing and will permit normal operation of the other valve units for at least two positions of the 3-way valve plunger. Furthermore, the 3-way valve plunger is reversible in its bore so that its stem may project from either end thereof and the same valve operation will be accomplished.

Although a highly efficient and simple form of structure has been shown and described, it is apparent that minor changes in the specific arrangement may be made without departing from the scope of the claims.

I claim:

1. In a 3-way valve, a body having a bore and having a first exhaust passage, a first motor passage, a first inlet passage, a second exhaust passage, a second inlet passage, a second motor passage and a third exhaust passage all open to the bore at spaced points and in that order, a plug closing the second motor passage from the exterior of the body, a cap attached to each end of the body and serving as a wall for the first and third exhaust passages respectively, one of the caps having a chamber for receiving a centering spring and the other having a chamber for receiving a packing, a solid valve plunger in the bore, said plunger having a stem end of reduced diameter extending from the bore adjacent the first exhaust passage through the cap having the packing chamber to the exterior of the valve body, means on the extended stem end for connecting the plunger to an operating means, said plunger having first, second, and third lands within the bore with first and second grooves therebetween, the other end of the plunger also being of reduced diameter and extending into the cap having the spring receiving chamber, centering spring means mounted on said reduced other plunger end and interposed between the plunger and the respective cap for urging the plunger to neutral position when it is in either operating position, said lands, grooves, and passages being so spaced and arranged that in the neutral position the first land closes the bore between the first exhaust and first motor passages, the second land closes the bore between the first motor, first inlet and second exhaust passages, the third land closes the bore between the second motor and third exhaust passages, the first groove is opposite the first motor passage only, and the second groove is opposite the second exhaust, the second inlet, and second motor passages, and in one operating position the first reduced stem end of the plunger connects the first motor and first exhaust passages and in the other operating position the other reduced plunger end connects the second motor and third exhaust passages, said centering means including a washer engageable with the body at points radially outward of the bore, said washer also having cutout portions in alignment with the bore and serving as a communication between the bore and the third exhaust passage.

2. In a 3-way valve, a body having a bore and having a first exhaust passage, a first motor passage, a first inlet passage, a second exhaust passage, a second inlet passage, a second motor passage and a third exhaust passage all open to the bore at spaced points and in that order, a plug closing the second motor passage from the exterior of the body, a cap attached to each end of the body and serving as a wall for the first and third exhaust passages respectively, one of the caps having a chamber for receiving a centering spring and the other having a chamber for receiving a packing, a solid valve plunger in the bore, said plunger having a stem end of reduced diameter extending from the bore adjacent the first exhaust passage through the cap having the packing chamber to the exterior of the valve body, means on the extended stem end for connecting the plunger to an operating means, said plunger being movable in either direction from a neutral position to operating positions, said plunger having first, second, and third lands within the bore with first and second grooves therebetween, the other end of the plunger also being of reduced diameter and extending into the cap having a spring receiving chamber, centering spring means mounted on said reduced other plunger end and interposed between the plunger and the respective cap for urging the plunger to neutral position when it is in either operating position, said lands, grooves, and passages being so spaced and arranged that in the neutral position the first land closes the bore between the first exhaust and first motor passages, the second land closes the bore between the first motor, first inlet and second exhaust passages, the third land closes the bore between the second motor and third exhaust passages, the first groove is opposite the first motor passage only, and the second groove is opposite the second exhaust, second inlet, and second motor passages, and in one operating position the first reduced stem end of the plunger connects the first motor and first exhaust passages, and in the other operating position the other reduced plunger end connects the second motor and third exhaust passages.

References Cited in the file of this patent

UNITED STATES PATENTS

| | | |
|---|---|---|
| 1,936,236 | Hill | Nov. 21, 1933 |
| 2,007,051 | Hirvonen | July 2, 1935 |
| 2,362,944 | Stephens | Nov. 14, 1944 |
| 2,600,702 | Stephens | June 17, 1952 |
| 2,610,022 | Meddock | Sept. 19, 1952 |